C. G. ETTE.
CAST METAL POLE.
APPLICATION FILED MAR. 23, 1908.
946,665.
Patented Jan. 18, 1910.
4 SHEETS—SHEET 3.
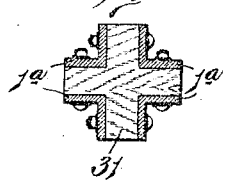
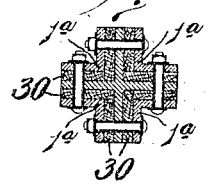
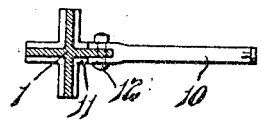
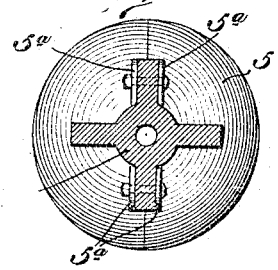
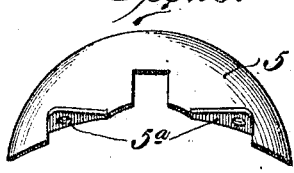
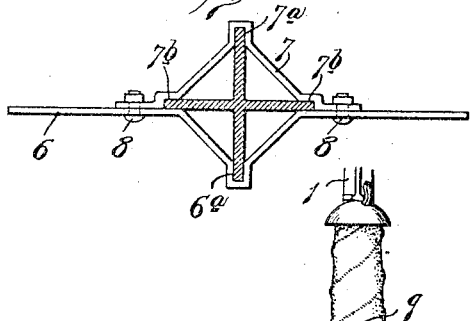
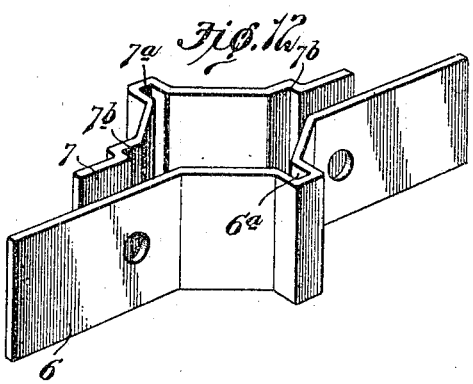
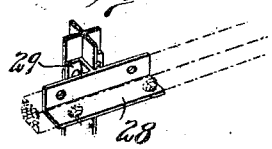
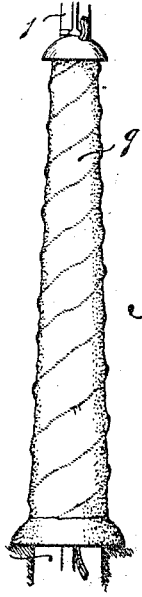
Witnesses:
Inventor,
Charles G. Ette.
By Bakewell Cornwall Attys.

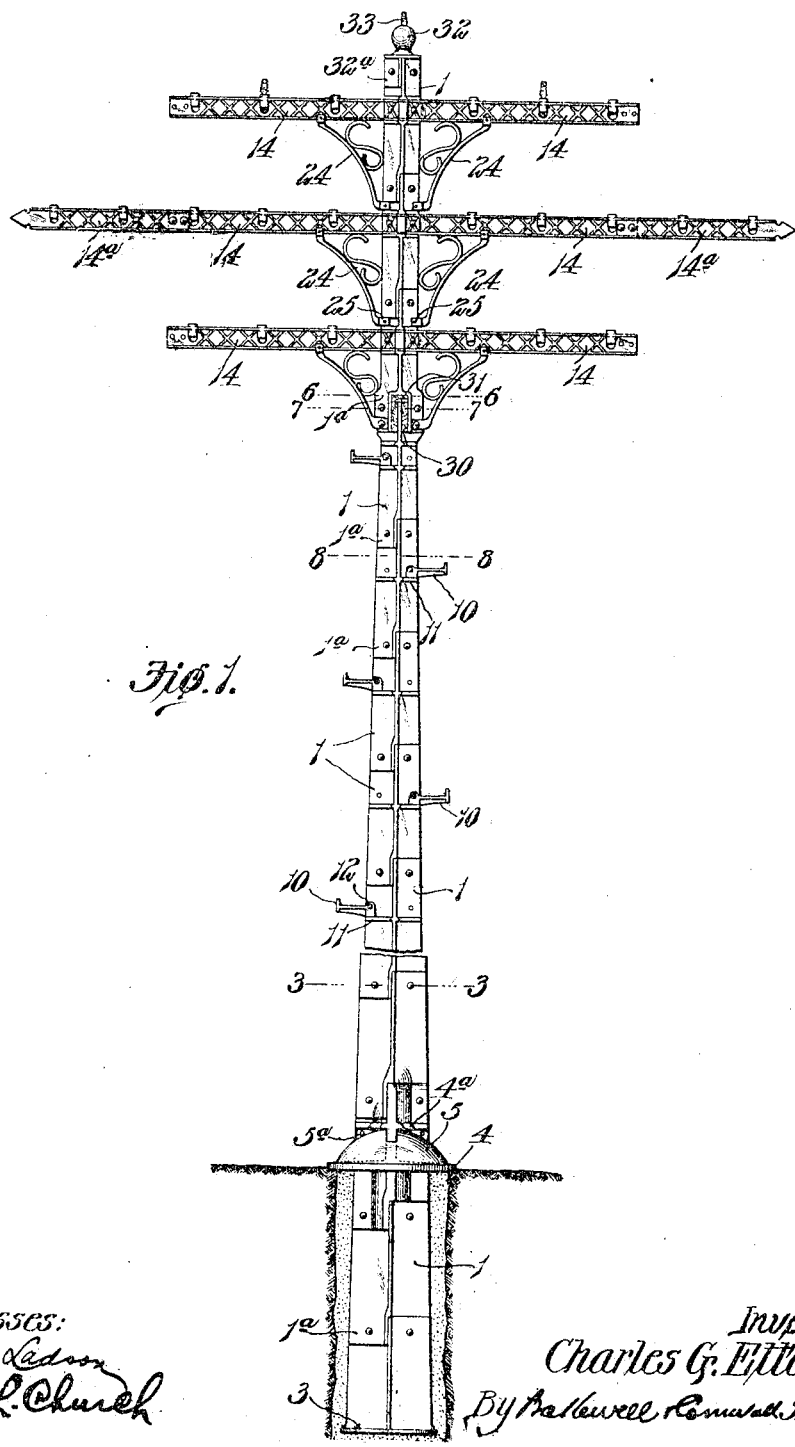

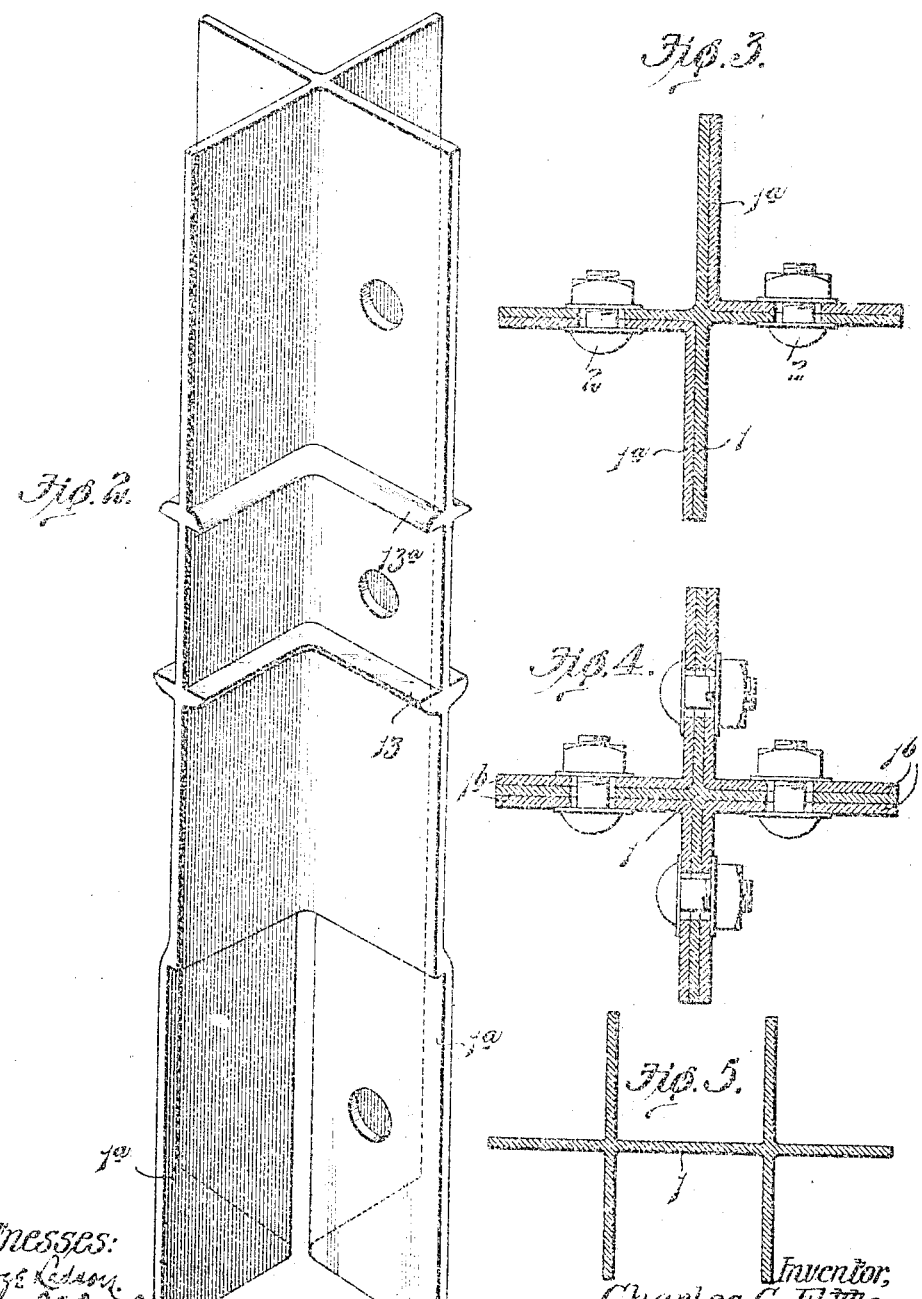

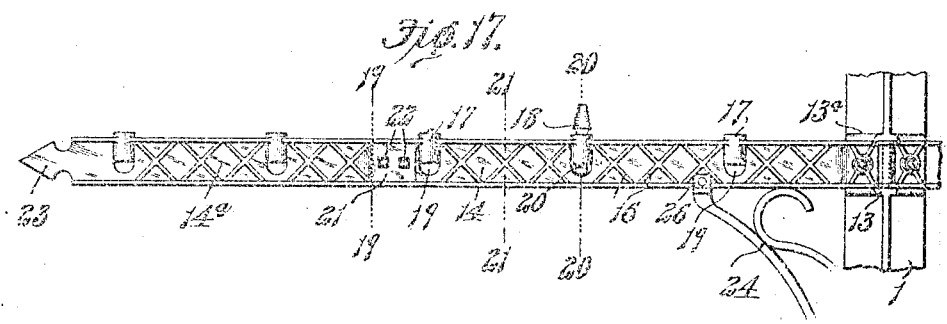
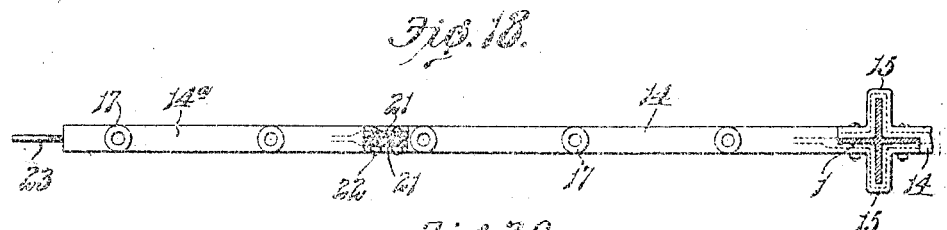
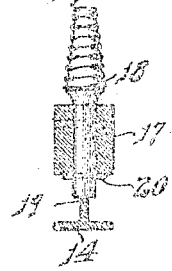
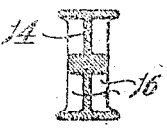
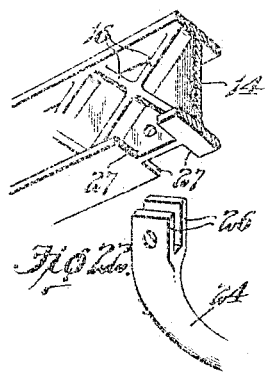

UNITED STATES PATENT OFFICE.

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

CAST-METAL POLE.

946,665.

Specification of Letters Patent. Patented Jan. 18, 1910.

Application filed March 23, 1908. Serial No. 422,801.

*To all whom it may concern:*

Be it known that I, CHARLES G. ETTE, a citizen of the United States, residing at St. Louis, Missouri, have invented a certain new and useful Improvement in Cast-Metal Poles, of which the following is a full, clear, and exact description, such as will enable others skilled in the art to which it appertains to make and use the same, reference being had to the accompanying drawings, forming part of this specification, in which—

Figure 1 is an elevation of a metallic pole constructed in accordance with my invention and provided with metallic cross arms which also form part of my invention; Fig. 2 is an enlarged perspective view of one of the sections from which the pole is formed; Fig. 3 is an enlarged cross sectional view taken on the line 3—3 of Fig. 1; Fig. 4 is a similar view showing a pole section of slightly different form in cross section; Fig. 5 is a cross sectional view of still another form of pole section; Fig. 6 is a horizontal sectional view taken on the line 6—6 of Fig. 1; Fig. 7 is a horizontal sectional view taken on the line 7—7 of Fig. 1; Fig. 8 is a horizontal sectional view taken on the line 8—8 of Fig. 1; Fig. 9 is a horizontal sectional view taken through the ground-line section of the pole and at a point above the dome-shaped foot-piece; Fig. 10 is a top plan view of a portion of the dome-shaped foot-piece; Fig. 11 is a cross sectional view of the pole showing my improved ground anchor in operative position; Fig. 12 is a perspective view of said anchor detached from the pole; Fig. 13 is a perspective view showing one way in which the cross arms can be connected to the pole; Fig. 14 is an elevational view showing the ornamental casing that can be applied to the pole; Fig. 15 is a horizontal cross sectional view of Fig. 14; Fig. 16 is a view similar to Fig. 15 and shows a casing of slightly different construction; Fig. 17 is a side elevation of one of the cross arm members, and an extension secured to said member; Fig. 18 is a top plan view of the parts shown in Fig. 17; Fig. 19 is a vertical sectional view taken on the line 19—19 of Fig. 17; Fig. 20 is an enlarged sectional view taken on the line 20—20 of Fig. 17; Fig. 21 is a vertical sectional view taken on the line 21—21 of Fig. 17; and Fig. 22 is a detail perspective view illustrating the way in which the brackets are connected to the cross arm members.

This invention relates to metallic posts and poles and particularly to poles that are used for supporting electric wires, such for example, as telegraph poles.

The main object of my invention is to provide a metallic pole that is strong, which can be manufactured at a low cost, and which presents a neat and ornamental appearance.

Another object of my invention is to provide a metallic pole composed of a number of comparatively short sections which are connected together in a novel manner.

Another object of my invention is to provide a metallic pole having metallic cross arms and means for insulating the lower portion of the pole from that portion to which the cross arms are connected. And still another object of my invention is to provide a metallic cross arm of novel construction.

Other desirable features of my invention will be hereinafter pointed out.

Referring to Fig. 1 of the drawings which illustrates the preferred form of my invention, 1 designates a plurality of sections that are connected together to form a pole. I prefer to form said sections tapering, as shown in Fig. 1, so that the lower portion of the pole will be of greater cross sectional dimensions than the upper portion of the pole, but it will, of course, be understood that all of the sections could be formed straight or of the same cross sectional area without departing from the spirit of my invention, or some of the sections could be straight and others tapering.

The pole sections 1 are formed of cast metal, preferably malleable iron, and in the preferred form of my invention as shown in detail in Figs. 2 and 3, said sections are of cruciform shape in cross section. A cast metal pole of this shape in cross section is strong and comprises a comparatively small amount of metal so that it can be produced at a low cost. It also obtains a better bearing in the ground or concrete in which it is embedded than a round pole would obtain. And still another advantage of forming the pole sections in this manner is that all parts of the section are of about the same thickness so that the heat will penetrate into every portion of the metal during the annealing operation. Each section 1 is provided at its lower end with integral depending wings 1ª that telescope over the underneath section and thus securely lock the sections together, the wings 1ª being offset slightly so as to produce shoulders or bearing surfaces that rest firmly upon the upper end of the underneath section. Preferably, the inner edges of the pair of wings 1ª at each side of the section are integrally connected so as to produce two oppositely disposed V-shaped extensions on the lower end of the section 1.

From the foregoing it will be seen that the weight of each section is transmitted directly to the section arranged underneath it as the laterally projecting flanges or legs of all of the sections are in vertical alinement with each other. The depending wings 1ª constitute the means for locking the sections together and for preventing one section from moving laterally relatively to the section on which it is mounted but as a safe-guard against accidental displacement of the sections, I prefer to use fastening devices 2 which pass through the depending wings 1ª and the portions of the adjacent section which said wings embrace. Bolts or rivets can be employed for this purpose or, if desired, the sections can be welded together. By providing the sections with integral depending wings 1ª, as above described, I produce a very strong and rigid pole and also prevent water from getting between the inside faces of the wings and the portions of the adjacent section which said wings embrace.

In Fig. 4 I have shown a pole section of slightly different form from that shown in Figs. 2 and 3, each leg or flange of the section shown in Fig. 4 being provided with a pair of depending wings 1ᵇ which embrace both faces of the coöperating leg or flange of the underneath pole section, said wings being connected together in such a manner that four V-shaped extensions are produced.

While I prefer to use sections 1 of cruciform shape in cross section I do not wish it to be understood that my broad idea is limited to a pole made up of sections of such form as the sections could be formed in the manner shown in Fig. 5 which illustrates a double cruciform-shaped section or an H shaped member provided with laterally projecting flanges arranged in alinement with its cross web.

The base section or lowermost section of the pole is provided with an integral flat base 3, as shown in Fig. 1, that affords a firm foundation and extended bearing surface for the pole and the section that is located at the ground-line is preferably made much heavier than the other sections of the pole, as shown in Fig. 1, as this section of the pole is most apt to rust and thus become weakened. As shown in Fig. 9, the central portion of this ground line section is cored out so that all portions of said section will be of approximately the same thickness and thus cause the heat to penetrate into every part of the metal during the annealing operation. If desired, the central portions of all the sections can be cored out so as to facilitate the annealing and produce a very strong and stiff pole, the central holes in the sections also forming a conduit through which wires can be run. The ground-line section is provided with an integral base plate 4 which rests on the surface of the ground, as shown in Fig. 1, and a hollow dome-shaped member or foot-piece 5 is mounted on said base plate 4. This foot-piece 5 can either be cast in one piece and be provided with an opening through which the ground-line section extends, or it can be formed in two or more parts, as shown in Figs. 9 and 10, each part being provided with upwardly projecting flanges 5ª that are connected to the portions of the ground-line section which they embrace. I prefer to provide the laterally projecting legs or flanges of the ground-line section with integral ribs 4ª that project laterally over the foot-piece 5 so as to form shields which prevent water from entering the opening in said foot-piece through which the ground-line section passes.

When the pole is embedded in earth I prefer to secure an anchor to the embedded portion of the pole, and in Figs. 11 and 12 I have shown one form of anchor that I can use with a pole of cruciform shape in cross section. Said anchor consists of a transversely extending member 6 provided with a pocket or recess 6ª for receiving one leg or flange of the pole section to which said member is connected and a coöperating member 7 provided with a pocket 7ª for receiving the oppositely disposed leg of said pole section and shoulders 7ᵇ that bear upon the intermediate legs or flanges of said pole section, as shown in Fig. 11. The members 6 and 7 are connected together by fastening devices 8 which also clamp said members to the pole section, thereby producing an adjustable ground anchor that can be arranged at any desired point on the pole.

If desired, the pole can be provided with an ornamental casing 9 that extends up the pole any desired distance so as to give a finished and massive appearance to the pole and also to serve as a conduit in case wires are to be run up the pole from the ground, as shown in Fig. 14. This casing 9 can be cast in one piece, as shown in Fig. 15, or it can be formed in sections 9ª that are connected together, as shown in Fig. 16.

The pole is provided with cast metal steps 10 having their inner ends bifurcated, as shown in Fig. 8, so that they will slip over or straddle one of the laterally projecting legs of a pole section, as shown in Figs. 1 and 8, the leg of the pole section which said step straddles being provided with an integral rib 11 upon which the bifurcated portion of the step rests. The steps are secured to the pole by fastening devices 12 which pass through the bifurcated portion of the step.

The sections of the pole to which the cross arms are connected are of practically the same construction as the sections which form the lower part of the pole except that the legs or flanges of the cross arm carrying sections are provided with pairs of integral parallel lugs or ribs 13 and 13$^a$, as shown in Figs. 2 and 17. The cross arms are formed of cast metal and each cross arm consists of two members 14 arranged on opposite sides of the pole and having their inner ends connected to the pole, said members being adapted to have extensions secured thereto to lengthen the cross arm as hereinafter described. Each of the cross arm members 14 is provided at its inner end with a portion 15 which receives one of the laterally projecting legs or flanges of the pole and bears against two of the other legs of the pole, as shown in Figs. 17 and 18, the portions 15 of said cross arm members being arranged between the parallel lugs 13 and 13$^a$ on the flanges of the pole. The portion 15 of one of the cross arm members is arranged on one side of the pole and the portion 15 of the other cross arm member is arranged on the opposite side of the pole, as shown in Fig. 18 and said portions are secured to the pole by means of fastening devices which pass through said parts. The lower ribs 13 of the pairs of parallel ribs on the pole constitute the supporting means for said cross arm members, and the upper ribs 13$^a$ of said pairs form shields that prevent water from running down into the joint between the pole and the portions 15 of the cross arm members so that rust cannot form on the cross arm and pole at the point where they are connected together. The cross arm members 14 are preferably of I-shape in cross section and if desired, the vertical webs of said members can be provided with integral intersecting diagonal ribs 16. Each cross arm member is provided at its upper side with a plurality of integral bosses or thickened portions 17 that are perforated to receive insulator pins 18, as shown in Figs. 17 and 20, the vertical web of the cross arm member being provided with openings 19 into which the lower ends of said insulator pins project and the pins being retained in position in the bosses 17 by means of keys or cotter pins 20 that pass through the pins below said bosses. The cross arm members 14 are so formed that extensions 14$^a$ can be added thereto to lengthen the cross arm, the extensions being provided at their inner ends with jaws 21 that embrace the vertical web of the cross arm member 14 and are connected thereto by fastening devices 22. If desired, the extensions 14$^a$ can be provided at their outer ends with arrow-shaped heads 23 that impart a neat and finished appearance to the cross arm. As an additional supporting means for the cross arms and also to impart an ornamental appearance to the pole I use brackets 24 provided at their lower ends with jaws 25 which embrace the legs or laterally projecting flanges of the pole and rest upon the ribs 13$^a$ on said flanges, said brackets being provided at their upper ends with jaws 26 that engage shoulders 27 on the lower flanges of the cross arm members which said brackets support and embrace the vertical webs of said cross arm members, as shown in Figs. 17 and 22. The jaws at the lower ends of the brackets are connected to the pole by suitable fastening devices and if desired, fastening devices can be employed for connecting the jaws at the upper ends of the brackets to the cross arm members but these last-mentioned fastening devices are not absolutely necessary as the shoulders 27 on the cross arm members hold the upper ends of the brackets in position.

Instead of using cross arms of the construction above-described I can use one-piece cross arms and secure them to L-shaped supports 28 provided with integral angle-shaped brackets 29 that are connected to the pole, as shown in Fig. 13. To overcome the necessity of insulating each cross arm from the pole I have constructed the pole so that the lower portion thereof is insulated from the upper portion to which the cross arms are connected. As shown in Fig. 1, the depending wings 1$^a$ on the pole section, to which the lowermost cross arm is connected, are so formed that they will not contact with the pole section arranged underneath said cross arm carrying section, thus providing spaces in which blocks of wood 30 or other suitable insulating material can be placed, as shown in Fig. 6, the bolts or fastening devices which pass through the depending wings of the cross arm carrying section being preferably surrounded by sleeves of insulating material. A block 31 of insulating material is also interposed between the lower end of the lowermost cross arm carrying section and the upper end of the pole section arranged underneath same so that said sections are perfectly insulated from each other and the entire upper portion of the pole which carries the cross arms is insulated from the lower portion of the pole. Each of the cross arm carrying sections of the pole is provided with means for sustaining one cross arm, and said sections are preferably of such length that the various cross arms will be separated from each other the usual distance or eighteen inches. It will, of course, be obvious, however, that the sections could be made long enough to carry more than one cross arm if so desired. An ornamental pole cap 32 provided with depending wings 32ᵃ is connected to the upper end of the pole and, if desired, said cap can be provided with a pin 33 for supporting an insulator.

A pole of the construction above described can be produced at a very low cost as all of the parts which form the pole are cast and no machine work is required in assembling the parts due to the fact that the holes through which the fastening devices pass and also the supporting ribs are formed at the time the parts are cast. The parts which form the pole are of such shape in cross section that the heat can penetrate into all portions of the metal during the annealing operation so that the metal will not crack when it is cooling off. The integral depending wings 1ᵃ and the integral ribs 13ᵃ on the pole sections prevent water from getting into the joints between the pole sections and the joints between the cross arms members and the pole so that there is no liability of these parts being eaten away by rust.

The pole presents a neat and ornamental appearance and can be used as a telegraph pole, flag-pole, electric light pole, or in fact, for any purpose that posts and poles are used for. Or, if desired, several of my improved poles could be arranged to form a tripod and thus produce a tower, the poles being connected together by braces so as to produce a strong and rigid structure.

Having thus described my invention, what I claim as new and desire to secure by Letters Patent is:

1. A cast metal pole provided with a ground-line section having a base plate which rests upon the ground in which the pole is embedded, a foot-piece embracing the pole and resting on said base plate, and means projecting laterally from said section to prevent water from entering the joint between said section and foot-piece.

2. A metal pole adapted to be embedded in the ground, a base plate adapted to rest on the top surface of the ground, a foot-piece surrounding the pole and resting on the base plate, and lugs on the pole for preventing water from entering the joint between said foot-piece and pole.

3. A pole, a base plate adapted to rest on the ground in which said pole is embedded, an approximately dome-shaped foot-piece surrounding the pole and resting on the base plate, and means projecting laterally from the pole for preventing water from entering the joint between said foot-piece and pole.

4. A cast metal pole having vertically disposed flanges or legs that are provided with integral ribs or lugs arranged horizontally, and pole steps provided with bifurcated ends which straddle said flanges and rest upon said lugs.

5. A metallic pole of angular shape in cross section, cross arm members provided at their inner ends with portions that conform to the shape of the pole and embrace same, and integral laterally projecting lugs on the pole between which the inner end portions of said cross arm members are arranged.

6. A metallic pole of approximately cruciform shape in cross section, a cross arm formed by a pair of members that are arranged on opposite sides of the pole and each of which is provided at its inner ends with a portion that conforms to the cross sectional shape of one-half of the pole, and laterally projecting devices formed integral with the pole to form supports for said cross arm members.

7. A metal pole provided with a cross arm which consists of a pair of cast metal members connected at their inner ends to the pole, means projecting laterally from the pole to prevent water from getting into the joints between said members and pole, brackets connected to the pole and to said members, and means projecting laterally from the pole to prevent water from getting into the joints between the pole and said brackets.

8. A metal pole provided with a cross arm which consists of a pair of cast metal members approximately I-shaped in cross section connected at their inner ends to the pole, brackets connected to the pole and to said members, said members having their lower flanges cut away to receive the upper ends of said brackets, and integral lugs on the pole which form abutments for the lower ends of said brackets.

9. A metal pole provided with laterally projecting legs or flanges, a cross arm connected to said pole, and brackets provided at their lower ends with jaws that embrace the legs or flanges of the pole and at their upper ends with jaws that embrace the cross arm, the cross arm being provided with shoulders that contact with the jaws on the upper ends of the brackets.

In testimony whereof I hereunto affix my signature in the presence of two witnesses, this nineteenth day of March 1908.

CHARLES G. ETTE.

Witnesses:
 EDWARD SCHWIDDE,
 WALTER CLARENCE RAITHEL.